United States Patent [19]

O'Brian

[11] 4,409,096
[45] Oct. 11, 1983

[54] CONTROL SYSTEMS FOR MATERIAL TREATMENT PLANT

[75] Inventor: Rodney W. O'Brian, Near Burton-on-Trent, England

[73] Assignee: Coal Industry (Patents) Ltd., London, England

[21] Appl. No.: 273,521

[22] Filed: Jun. 15, 1981

[30] Foreign Application Priority Data

Jul. 15, 1980 [GB] United Kingdom ............... 8023098

[51] Int. Cl.³ ...................... B03B 7/00; G05D 11/02
[52] U.S. Cl. ..................................... 209/10; 209/17; 209/236; 209/350; 366/131; 366/152
[58] Field of Search ........................ 209/1, 10, 17, 236, 209/239, 255, 350, 44, 233, 235, 491, 496; 366/16, 17, 131, 152, 160; 222/145; 414/270

[56] References Cited

U.S. PATENT DOCUMENTS 2,888,026 5/1959 Henderson et al. ............... 366/17
2,973,861 3/1961 Jager ..................................... 209/1
3,494,217 2/1970 Tanaka et al. ..................... 209/1 X
4,220,526 9/1980 Armstrong et al. ........... 209/350 X

FOREIGN PATENT DOCUMENTS 615321 1/1949 United Kingdom .
951057 3/1964 United Kingdom .
2033110 5/1980 United Kingdom .

OTHER PUBLICATIONS

"Method for Controlling Coffee Density" in Research Disclosure, No. 201, pp. 3-4, Jan. 1981.

Primary Examiner—Ralph J. Hill
Attorney, Agent, or Firm—James Creighton Wray

[57] ABSTRACT

A control system of particulate material treatment plant comprising screening means which produces undersize and oversize fractions and which is controllable to vary one size fraction relatively to the other size fraction, preparation or dense medium washer means producing a relatively low ash oversize fraction and a relatively high ash oversize fraction and two storage bunkers for the undersize fraction and for the relatively low ash oversize fraction, respectively, the control system comprising sensor means for sensing the amounts of particulate material in each of the two storage bunkers and for deriving signals indicative of the sensed amounts, control means receive the derived signals and control the operation of the screening means in accordance with the received signals.

15 Claims, 1 Drawing Figure

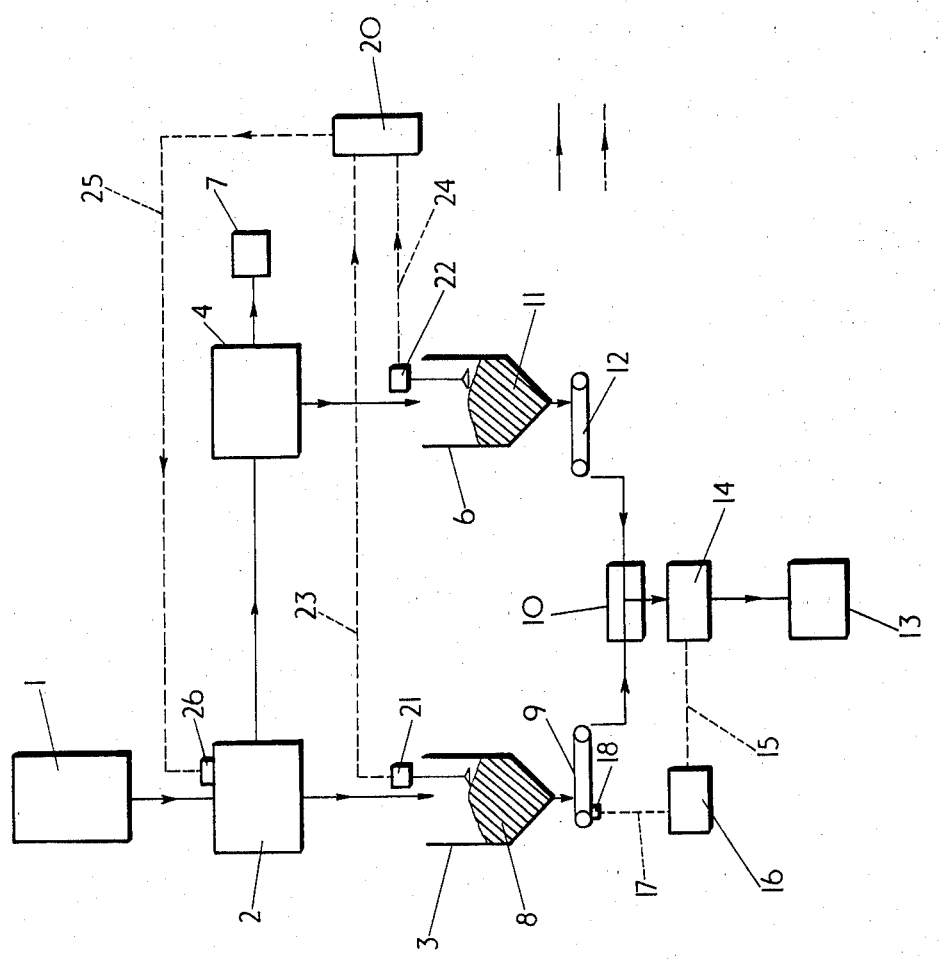

CONTROL SYSTEMS FOR MATERIAL TREATMENT PLANT

This invention relates to control systems for material treatment plant.

In particular, although not exclusively, the present invention relates to control systems for particulate material treatment plant in which particulate material is screened into undersize and oversize fractions, the oversize fraction being treated to produce a relatively low ash oversize fraction which subsequently is blended with the undersize fraction to produce a blend having a lower ash concentration than the original untreated particulate material. Prior to blending the undersize fraction and the relatively low ash oversize fraction are stored in storage bunkers, the prior known control systems tending to control discharge from at least one of the storage bunkers to produce a desired blend. Unfortunately, the present control systems do not take into account the relative proportions of undersize material and oversize material in the untreated particulate material and in consequence the amounts of particular material stored in the storage bunkers tend to vary being dependent upon the relatively proportions of the undersize and oversize material constituting the untreated material. In addition, the amounts of stored material in the storage bunkers also is determined by the rate of extraction of untreated material from the untreated bunker which will vary dependent upon the ash content of the untreated coal, for example, if the ash content of the untreated material increases a smaller proportion can be added to the blend resulting in an increase in the quantity stored in the untreated bunker and vice versa if the untreated ash content decreases. Thus, a problem with prior known particulate material treatment plant is that inefficient use is made of the storage available.

An object of the present invention is to provide a control system for particulate material treatment plant which tends to overcome or reduce the above mentioned problem.

According to the present invention, a control system for material treatment plant comprising first material treatment means for producing a first treated fraction and a second treated fraction, operation of the first treatment means being controllable to vary one of the treated fractions relative to the other of the treated fractions, further material treatment means for further treating one of said treated fractions produced by the first treatment means to produce a first further treated fraction and a second further treated fraction, and separate storage means for one of said treated fractions, respectively, the control system comprising sensor means for sensing the amounts of material in each of the separate storage means and for deriving signal means indicative of the sensed amounts of stored material, and control means for receiving said derived signal means and for controlling the operation of said first treatment means in accordance with the received signal means.

Preferably, the control means controls the operation of said first treatment means such that, in use, the sensed amounts of stored material in said separate storage means tend to be maintained substantially equal or within preselected limits with respect to each other.

In addition, the present invention provides material treatment plant comprising first material treatment means for producing a first treated fraction and a second treated fraction, operation of the first treatment means being controllable to vary one of the treated fractions relative to the other of the treated fractions, further material treatment means for further treating one of said treated fractions produced by the first treatment means to produce a first further treated fraction and a second further treated fraction, separate storage means for one of said treated fractions and for one of said further treated fractions, respectively, and a control system comprising sensor means for sensing the amounts of stored material in each of said separate storage means and for deriving signal means indicative of the sensed amounts of stored material, the control system further comprising control means for receiving said derived signal means and for controlling the operation of said first treatment means in accordance with the received signal means.

Preferably, the control means controls the operation of said first treatment means such that, in use, the sensed amounts of stored material in said separate storage means tend to be maintained substantially equal or within preselected limits with respect to each other.

The present invention also provides a control system for particulate material treatment plant comprising screening means for screening the particulate material into an undersize fraction and an oversize fraction, operation of the screening means being controllable to vary one size fraction relatively to the other size fraction, preparation means for treating the oversize fraction to produce a relatively low ash oversize fraction and a relatively high ash oversize fraction, and at least two storage bunkers for said undersize fraction and for the said relatively low ash oversize fraction, respectively, the control system comprising sensor means for sensing the amounts of particulate material in each of the two storage bunkers and for deriving signals indicative of the sensed amounts of stored material, the control system further comprising control means for receiving said derived signal and for controlling the operation of the screening means in accordance with the received signals.

Preferably, the control system controls the screening means such that, in use, the sensed amounts of stored material in said storage bunkers tend to be maintained substantially equal or within preselected limits with respect to each other.

Advantageously, the screening means comprises a rotatable screening deck, one size fraction being varied relatively to the other size fraction by varying the rotational speed of the screening deck.

Conveniently, the particulate material treatment plant comprises blending means including discharge means for conveying particulate material from the two storage bunkers to common receiving means.

Advantageously, the control system comprises further control means for the blending means.

Preferably, further sensor means are provided for sensing the ash concentration of the blended particulate material and for deriving a signal indicative of the sensed ash concentration.

Preferably, said further control means is adapted to control discharge of particulate material from at least one of the storage bunkers in accordance with the derived signal from said further sensor means.

The present invention also provides particulate material treatment plant comprising screening means for screening the particulate material into an undersize fraction and an oversize fraction, operation of the screening means being controllable to vary one size fraction relatively to the other size fraction, preparation means for treating the oversize fraction to produce a relatively low ash oversize fraction and a relatively high ash oversize fraction, at least two storage bunkers for said undersize fraction and for said relatively low ash oversize fraction, respectively, and a control system comprising sensor means for sensing the amounts of particulate material in each of the two storage bunkers and for deriving signals indicative of the sensed amounts of stored material, the control system further comprising control means for receiving said derived signals and for controlling the operation of the screening means in accordance with the received signals.

Preferably, the control system controls the screening means such that, in use, the sensed amounts of stored material in said storage bunkers tend to be maintained substantially equal or within preselected limits with respect to each other.

Advantageously, the screening means comprises a rotatable screening deck, one size fraction being varied relatively to the other size fraction by varying the rotational speed of the screening deck.

Conveniently, the particulate material treatment plant comprises blending means including discharge means for conveying particulate material from the two storage bunkers to common receiving means.

Advantageously, the control system comprises further control means for the blending means.

Preferably, further sensor means are provided for sensing the ash concentration of the blended particulate material and for deriving a signal indicative of the sensed ash concentration.

Preferably, said further control means is adapted to control discharge of particulate material from at least one of the storage bunkers in accordance with the derived signal from said further sensor means.

By way of example only, one embodiment of the present invention will be described with reference to the accompanying drawings which shows a flow diagram for a coal treatment plant.

Raw untreated particulate material is fed from a storage bunker 1 or other suitable feed or storage means to first treatment means comprising a rotating screen 2 having a variable speed rotatable screening deck arranged to screen the particular material into an undersize fraction which passes through the screening deck and fed to a first storage bunker 3 and an oversize fraction which is discharged around the periphery of the rotating screening deck and fed to further treatment means 4 comprising preparation or dense medium washer means arranged to treat the oversize material to produce a relatively low ash oversize fraction which is fed to a second storage bunker 6 and a relatively high ash oversize material which is fed to a tip 7.

Typically the screening means 2 comprising a rotating deck screen of the kind disclosed in our prior British patent specifications Ser. Nos. 1,307,290, 2,005,157 and 2,030,475. The preparation or dense medium washer means 4 may be of any suitable kind.

The undersize fraction 8 stored in the storage bunker 3 is discharged via a variable speed conveyor 9 and fed to a receiver unit 10 where it is blended with the relatively low ash oversize fraction 11 discharged from the storage bunker 6 by a constant speed conveyor 12. The blended material fed from the received unit 10 to storage or transport means 13 is sensed by sensor means 14 constituted by an ash monitor arranged to determine the ash concentration of the blended particulate material and to derive a signal indicative of the sensed ash concentration. This derived signal is passed along control line 15 to control means 16 which controls the speed of the discharge conveyor 9 by feeding a control signal along control line 17 to a speed controller 18. The control means 16 constituting part of the control system of the treatment plant.

Thus, in operation, if the ash monitor 14 senses a fall below a preselected level in the ash concentration of the blended particulate material, the speed of the discharge conveyor 9 is increased to feed more undersize material to the receiving unit thereby increasing the ash concentration towards the preselected level. On the otherhand if the ash monitor senses an increase in the ash concentration above the preselected level the speed of the discharge conveyor 9 is reduced by a suitable amount.

In a typical coal treatment plant the raw material fed from the storage bunker 1 would have a 30% to 40% ash concentration. It will be appreciated that the undersize fraction will have a similar 30% to 40% ash concentration. After further treatment by the preparation on washer means 4 the relatively low ash oversize material will have a typical ash concentration of 6% to 8%. A typical preselected level for the ash concentration of the blended material is 14%.

The plant control system also comprises control means 20 which may be a two term indicating controller as for example a commercially obtainable Kent Flexel. The control system also comprises sensor means constituted by two sensors 21 and 22 arranged to sense the level of material stored in the storage bunkers 3 and 6, respectively. The two sensors 21 and 22 derive signals indicative of the sensed material levels, the derived signals being fed along control lines 23 and 24 to the control means 20 which in turn derives a control signal which is fed along control line 25 to a speed controller 26 provided for the screening means 2 which controls the rotational speed of the rotating screening deck to thereby vary one of the size fractions relatively to the other size fraction.

The sensor 22 initially is set to detect the level of relatively low ash oversize material in the storage bunker 6. In use, with the material level in bunker 6 at the sensed level, the sensor 22 feeds a signal to the control means indicating that the material is at the sensed level.

The sensor 21 is arranged to sense change in the level of material in the bunker 3 such that if the level in bunker 3 changes significantly from that in bunker 6, the control means 20 recognises the difference in the signal received on line 23 compared to the signal received on line 24 and in consequence feeds a control signal to the screen speed controller 26 which thereby suitably adjust the rotation speed of the rotating screen.

For example, if the level of material in bunker 3 is sensed to fall, the control means 20 feeds a signal to the speed controller 26 to cause the rotational speed of the screening deck to fall thereby increasing the undersize fraction relatively to the oversize fraction. Thus, the level of undersize material in bunker 3 will tend to rise and that in bunker 6 will tend to fall until the signals fed on lines 23 and 24 once again balance indicating the two levels coincide. On the other hand if the level of material in the bunker 3 is sensed to rise, the control means 20 will feed a signal to the speed controller 26 to cause the rotational speed of the screening deck to increase thereby reducing the undersize fraction relatively to the oversize fraction. Thus, the level of undersize material in bunker 3 will tend to fall and the level of relatively low ash oversize material in bunker 6 will tend to rise until the two signals fed to the control means 30 on lines 23 and 24 are balanced and the levels of material in the two bunkers coincide.

From the above description it will be seen that the control system of the present invention tends to maintain the two bunker contents substantially at an equal level with respect to each other within preselected limits tending to ensure that the blend constituents for the blending process are available simultaneously. The present invention tends to optimse the available bunker capacity and tends to lead to an increased operational efficiency.

In other embodiments of the invention the operational role of the sensors 21 and 22 is reversed.

I claim:

1. Material treatment plant comprising first material treatment means for producing a first treated fraction and a second treated fraction, operation of the first treatment means being controllable to vary one of the treated fractions relative to the other of the treated fractions, further material treatment means for further treating one of the said treated fractions produced by the first treatment means to produce a first further treated fraction and a second further treated fraction, separate storage means for the other of said treated fractions and for one of said further treated fractions, respectively, and a control system comprising sensor means for sensing the amounts of stored material in each of said separate storage means and for deriving signal means indicative of the sensed amounts of stored material, the control system further comprising control means for receiving said derived signal means and for controlling the operation of said first treatment means in accordance with the received signal means.

2. Material treatment plant as claimed in claim 1, in which the control system controls the operation of said first treatment means such that, in use, the sensed amounts of stored material in said separate storage means tend to be maintained within preselected limits.

3. A control system for particulate material treatment plant comprising screening means for screening the particulate material into an undersize fraction and an oversize fraction, operation of the screening means being controllable to vary one size fraction relatively to the other size fraction, preparation means for treating the oversize fraction to produce a relatively low ash oversize fraction and a relatively high ash oversize fraction, and at least two storage bunkers for said undersize fraction and for said relatively low ash oversize fraction, respectively, the control system comprising sensor means for sensing the amounts of particulate material in each of the two storage bunkers and for deriving signals indicative of the sensed amounts of stored material, the control system further comprising control means for receiving said derived signals and for controlling the operation of the screening means in accordance with the received signals.

4. A control system as claimed in claim 3, in which the control means controls the screening means such that, in use, the sensed amount of stored material in said storage bunkers tend to be maintained substantially equal or within preselected limits with respect to each other.

5. A control system as claimed in claim 4, in which the screening means comprises a rotatable screening deck, one size fraction being varied relatively to the other size fraction by varying the rotational speed of the screening deck.

6. A control system as claimed in claim 5, further comprising blending means for blending particular material from the two storage bunkers, and in which the control system comprises further control means for the blending means.

7. A control system as claimed in claim 6, in which further sensor means are provided for sensing the ash concentration of the blended particulate material and for deriving a signal indicative of the sensed ash concentration.

8. A control system as claimed in claim 7, in which said further control means is adapted to control discharge of particulate material from at least one of the storage bunkers in accordance with the derived signal from said further sensor means.

9. Particulate material treatment plant comprising screening means for screening the particulate material into an undersize fraction and an oversize fraction, operation of the screening means being controllable to vary one size fraction relatively to the other size fraction, preparation means for treating the oversize fraction to produce a relatively low ash oversize fraction and a relatively high ash oversize fraction, at least two storage bunkers for said undersize fraction and for said relatively low ash oversize fraction, respectively, and a control system comprising sensor means for sensing the amounts of particulate material in each of the two storage bunkers and for deriving signals indicative of the sensed amounts of stored material, the control system further comprising control means for receiving said derived signals and for controlling the operation of the screening means in accordance with the received signals.

10. Particulate material treatment plant as claimed in claim 9, in which the control system controls the screening means such that, in use, the sensed amounts of stored material in said storage bunkers tend to be maintained substantially equal or within preselected limits with respect to each other.

11. Particulate material treatment plant as claimed in claim 10, in which the screening means comprises a rotatable screening deck, one size fraction being varied relatively to the other size fraction by varying the rotational speed of the screening deck.

12. Particulate material treatment plant as claimed in claim 11, in which blending means including discharge means for conveying particulate material from the two storage bunkers to common receiving means.

13. Particulate material treatment plant as claimed in claim 12, in which the control system comprises further control means for the blending means.

14. Particulate material treatment plant as claimed in claim 13, in which further sensor means are provided for sensing the ash concentration of the blended particulate material and for deriving a signal indicative of the sensed ash concentration.

15. Particulate material treatment plant as claimed in claim 14, in which said further control means is adapted to control discharge of particulate material from at least one of the storage bunkers in accordance with the derived signal from said further sensor means.

* * * * *